United States Patent
Niwa et al.

(10) Patent No.: US 8,878,518 B2
(45) Date of Patent: Nov. 4, 2014

(54) SENSOR DEVICE AND SENSOR INTERFACE

(75) Inventors: Masahisa Niwa, Osaka (JP); Kunitaka Okada, Osaka (JP); Rudolf Hajek, Babice u Rosic (CZ); Jiri Kutej, Brno (CZ); Timothy J. Warneck, Hatfield, PA (US)

(73) Assignee: Panasonic Corporation, Osaka (JP)

( * ) Notice: Subject to any disclaimer, the term of this patent is extended or adjusted under 35 U.S.C. 154(b) by 161 days.

(21) Appl. No.: 13/566,564

(22) Filed: Aug. 3, 2012

(65) Prior Publication Data

US 2014/0035558 A1 Feb. 6, 2014

(51) Int. Cl.
*G01R 19/00* (2006.01)
(52) U.S. Cl.
USPC ........................................................ 324/76.11
(58) Field of Classification Search
CPC ........... G01R 31/2886; G01R 31/2607; G01R 31/30; G01R 31/31723; G01R 31/2884; G01R 31/2891
USPC ................................ 324/762.01–762.1, 76.11
See application file for complete search history.

(56) References Cited

U.S. PATENT DOCUMENTS

| | | | |
|---|---|---|---|
| 5,754,963 A * | 5/1998 | Nunneley et al. | 701/33.7 |
| 5,805,466 A | 9/1998 | Roeckner et al. | |
| 6,115,654 A * | 9/2000 | Eid et al. | 701/29.8 |
| 2012/0198908 A1 | 8/2012 | Warneck | |

FOREIGN PATENT DOCUMENTS

WO   WO-2012/106213 A1   8/2012

* cited by examiner

*Primary Examiner* — Tung X Nguyen
(74) *Attorney, Agent, or Firm* — McDermott Will & Emery LLP

(57) ABSTRACT

A mode detector in a sensor interface is configured to detect a mode specified by a mode signal when an input signal received from a side of a first terminal is the mode signal. A communication portion in the interface transmits an electric signal, obtained from a sensor circuit, to a side of a second terminal when a mode detected with the detector is a sensor output mode. The communication portion receives an input signal from the side of the first terminal while transmitting an output signal to the side of the second terminal, when a mode detected with the detector is a communication mode.

17 Claims, 9 Drawing Sheets

SENSOR DEVICE AND SENSOR INTERFACE

TECHNICAL FIELD

The invention relates generally to sensor devices and sensor interfaces and, more particularly, to a sensor device comprising a sensor interface arranged between an output of a sensor circuit and a terminal portion, and the sensor interface.

BACKGROUND ART

U.S. Pat. No. 5,805,466 (hereinafter referred to as a "document 1") discloses an electronic device including: a pressure sensor element; power supply, output and GND terminals; and a circuit arranged therebetween. The circuit includes a signal processor, an output driver, a data storage and a calibration controller. The calibration controller includes a calibration mode detector and an I/O control.

In normal use, the signal processor receives an input signal requiring calibration from the pressure sensor element and then produces a calibrated signal through the output driver and across the output terminal.

On the other hand, when the calibration mode detector has receives a calibration mode signal, the detector disables the output driver and enables the I/O control. Once the I/O control is enabled, calibration data are allowed to be written to the data storage device across the output terminal.

The document 1 discloses a configuration that the power supply terminal is further used for a signal input. Even in this configuration, calibration data can be written to the data storage device across the output terminal.

In short, the electronic device transmits a calibrated signal to the exterior through the output terminal, and also receives calibration data through the output terminal.

Since the electronic device however employs one output terminal as an input and output terminal, it is necessary to separate an input time as the input terminal and an output time as the output terminal.

SUMMARY OF INVENTION

It is desirable to respectively receive and transmit an input signal and an output signal at the same time without increasing the number of terminals of a terminal portion.

A sensor device of the present invention comprises: a sensor circuit (SC); a terminal portion (T) comprising a first terminal (T1) and a second terminal (T2); and a sensor interface (10) located between an output of the sensor circuit (SC) and the terminal portion (T). The sensor interface (10) comprises a mode detector (20) configured to detect a mode specified by a mode signal when an input signal ($S_{T1}$) received from a side of the first terminal (T1) is the mode signal. The sensor interface (10) is configured: to transmit an electric signal, obtained from the sensor circuit (SC), to a side of the second terminal (T2) when the mode detected with the mode detector (20) is a sensor output mode; and also to receive an input signal ($S_{T1}$) from the side of the first terminal (T1) while transmitting an output signal ($S_{T2}$) to the side of the second terminal (T2), when the mode detected with the mode detector (20) is a communication mode.

In an embodiment, the terminal portion (T) further comprises a third terminal (T3). The first, second and third terminals (T1, T2 and T3) are power, output and ground terminals, respectively, and are adapted to be connected with an external device (ED). The sensor interface (10) further comprises a communication portion (30) and a memory circuit (40). The sensor interface (10) is configured to transmit the electric signal, corresponding to a target object's physical quantity obtained from the sensor circuit (SC), to a side of the output terminal (T2) when the mode detected with the mode detector (20) is the sensor output mode. The communication portion (30) is configured to store data obtained from a serial input signal in the memory circuit (40) while transmitting a serial output signal to the external device (ED) through the output terminal (T2), if receiving a serial input signal when the mode detected with the mode detector (20) is the communication mode, where said serial input signal is said input signal ($S_{T1}$) transmitted from the external device (ED) and received from a side of the power terminal (T1), and said serial output signal is said output signal ($S_{T2}$).

In an embodiment, the sensor interface (10) is configured to transmit a current signal as said serial output signal to the external device (ED) through the output terminal (T2) by supplying an electric current corresponding to the serial output signal through the output terminal (T2) in accordance with a clock signal.

In an embodiment, the mode detector (20) is configured to detect a communication mode if, in the sensor output mode, a mode designated by a mode signal received from the side of the first terminal (T1) changes to a transition mode and then changes to the communication mode. The mode signal of the transition mode changed from the sensor output mode differs from the mode signal changed from the communication mode.

In an embodiment, a mode signal of a transition mode changed from at least one of the sensor output mode and the communication mode is a voltage signal higher than a mode signal's level of a mode before the change to the transition mode.

In an embodiment, a prescribed digital signal is applied to the power terminal (T1) to be added to at least one of the mode signal of the transition mode changed from the sensor output mode and the mode signal changed from the communication mode.

In an embodiment, the memory circuit (40) comprises a nonvolatile memory.

In an embodiment, the sensor device comprises a monolithic IC equipped with the sensor circuit (SC) and the sensor interface (10).

In an embodiment, the sensor interface (10) further comprises a signal processing circuit (50) and an output circuit (60). The signal processing circuit (50) is configured to calibrate the electric signal from the sensor circuit (SC) based on the data stored in the memory circuit (40). The output circuit (60) is arranged between the output terminal (T2) and both of the communication portion (30) and the signal processing circuit (50). The output circuit (60) is configured to output the electric signal ($S_{SCS}$) calibrated with the signal processing circuit (50) to the side of the output terminal (T2) and also to output the serial output signal, from the communication portion (30), to the side of the output terminal (T2).

In an embodiment, the communication portion (30) comprises a communication circuit (301) configured to transmit said output signal ($S_{T2}$) to the side of the second terminal (T2). The output circuit (60) is configured: to output the electric signal, from the signal processing circuit (50), to the side of the output terminal (T2) when the mode detected with the mode detector (20) is the sensor output mode; and also to output the output signal, from the communication circuit (301), to the side of the output terminal (T2) when the mode detected with the mode detector (20) is the communication mode.

In an embodiment, the sensor device comprises, as said sensor circuit (SC), first and second sensor circuits (SC1 and SC2) configured to detect the same physical quantity. The sensor device comprises, as said sensor interface (10), first and second sensor interfaces (11 and 12). As said mode detector (20), said communication portion (30) and said memory circuit (40), said first sensor interface (11) comprises a first mode detector (21), a first communication portion (31) and a first memory circuit (41), respectively while said second sensor interface (12) comprises a second mode detector (22), a second communication portion (32) and a second memory circuit (42), respectively. Said first sensor interface (11) is arranged between an output of the first sensor circuit (SC1) and the terminal portion (T). Said second sensor interface (12) is arranged between an output of the second sensor circuit (SC2) and the terminal portion (T). The first and second sensor interfaces (11 and 12) comprise first and second transfer circuits (TC1 and TC2), respectively. One of a first or second transfer circuit (TC1 or TC2) is configured to receive a serial transfer signal ($S_{ST}$), and the other (TC2 or TC1) is configured to transmit the serial transfer signal ($S_{ST}$) to said one of a first or second transfer circuit (TC1 or TC2). Preferably, the second transfer circuit (TC2) is configured to transmit the serial transfer signal ($S_{ST}$) to the first sensor interface (11), and the first transfer circuit (TC1) is configured to receive the serial transfer signal ($S_{ST}$).

In an embodiment, the second sensor interface (12) is electrically connected with the output of the second sensor circuit (SC2) while electrically connected with only the power and ground terminals (T1 and T3) of the terminal portion (T).

In an embodiment, the second sensor interface (12) is configured: to transmit a first serial transfer signal to the first sensor interface (11) through the second transfer circuit (TC2) based on a second electric signal corresponding to a target object's physical quantity obtained from the second sensor circuit (SC2), when the mode detected with the second mode detector (22) is the sensor output mode; and also to store second data obtained from a second serial input signal in the second memory circuit (42) while transmitting a second serial transfer signal to the first sensor interface (11) through the second transfer circuit (TC2), if receiving the second serial input signal through the power terminal (T1) when the mode detected with the second mode detector (22) is the communication mode, said second serial input signal being an input signal ($S_{T1}$) addressed to the second sensor interface (12) from the external device (ED), said second serial transfer signal being for a second serial output signal as said output signal ($S_{T2}$) to the external device (ED). The first sensor interface (11) is configured: when the mode detected with the first mode detector (21) is the communication mode, to store first data obtained from a first serial input signal in the first memory circuit (41) if receiving the first serial input signal through the power terminal (T1), said first serial input signal being an input signal ($S_{T1}$) addressed to the first sensor interface (11), transmitted from the external device (ED) and received from the side of the power terminal (T1); and also to transmit, as said output signal ($S_{T2}$), a first serial output signal to the external device (ED) through the output terminal (T2), and also, if receiving said second serial transfer signal through the first transfer circuit (TC1), to transmit the second serial output signal to the external device (ED) through the output terminal (T2) based on the second serial transfer signal.

In an embodiment, the second sensor interface (12) is configured to transmit a first serial transfer signal to the first sensor interface (11) through the second transfer circuit (TC2) based on a second electric signal corresponding to a target object's physical quantity obtained from the second sensor circuit (SC2), when the mode detected with the second mode detector (22) is the sensor output mode. The first sensor interface (11) is configured: when the mode detected with the first mode detector (21) is the sensor output mode, to transmit a first electric signal to the side of the output terminal (T2), said first electric signal corresponding to a target object's physical quantity obtained from the first sensor circuit (SC1); and also to transmit a second electric signal to the side of the output terminal (T2) based on the first serial transfer signal if receiving the first serial transfer signal through the first transfer circuit (TC1).

In an embodiment, the first sensor interface (11) is configured to transmit any of the first and second electric signals to the side of the output terminal (T2) in accordance with a configuration parameter stored in the first memory circuit (41).

In an embodiment, the first sensor interface (11) further comprises a failure detection circuit (81) configured, if a difference between a physical quantity of the first electric signal and a physical quantity of the second electric signal exceeds a predetermined threshold, to transmit an error signal, representing that the difference exceeds the threshold, to the external device (ED) through the output terminal (T2).

In an embodiment, an input signal ($S_{T1}$) from the side of the first terminal (T1) is received, while an output signal ($S_{T2}$) is transmitted to the side of the second terminal (T2). It is accordingly possible to receive and transmit an input signal and an output signal at the same time, respectively, without increasing the number of terminals of a terminal portion.

BRIEF DESCRIPTION OF DRAWINGS

Preferred embodiments of the invention will now be described in further details. Other features and advantages of the present invention will become better understood with regard to the following detailed description and accompanying drawings where.

DESCRIPTION OF EMBODIMENTS

Figure 1:
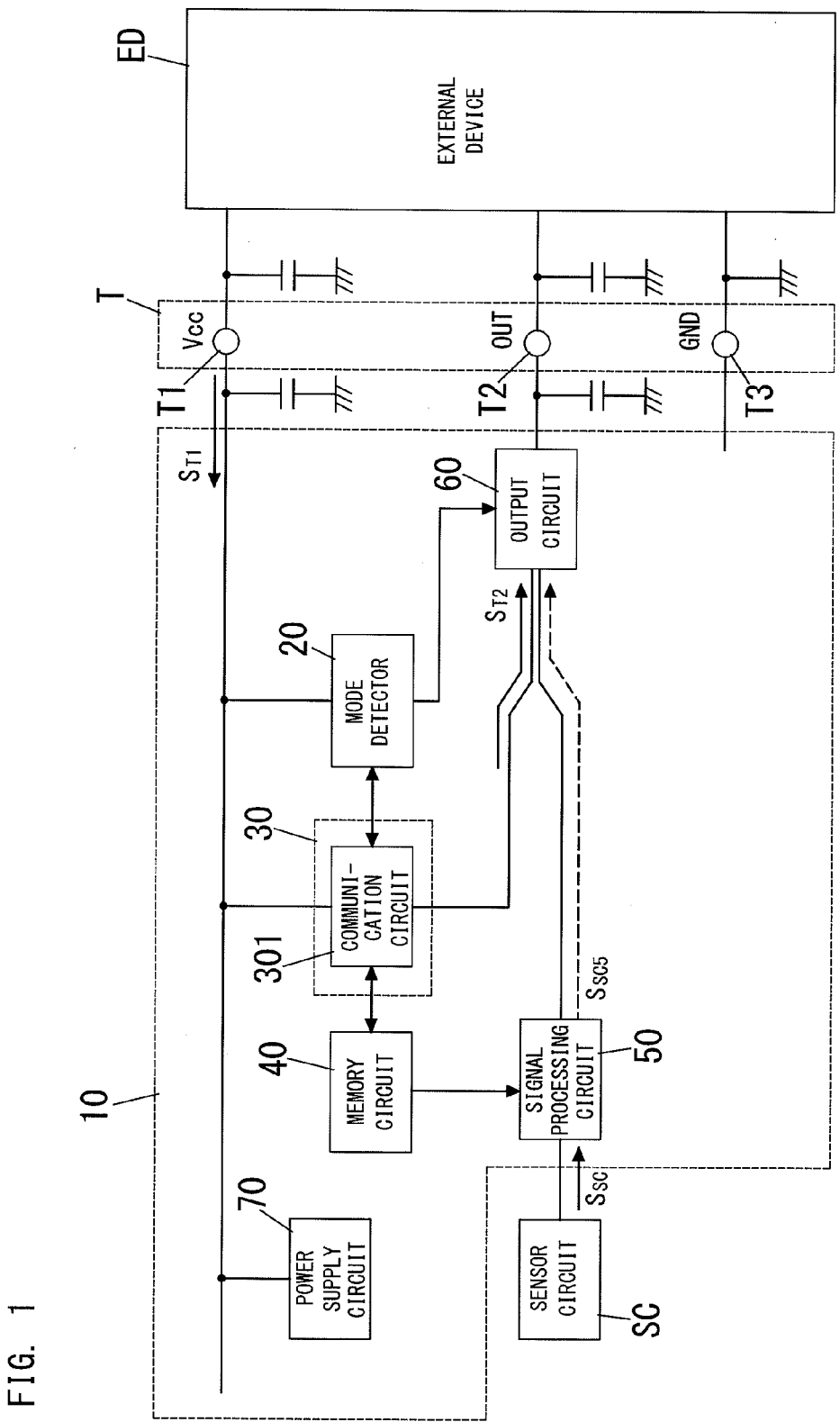
FIG. 1 is a block diagram of a sensor device in accordance with a first embodiment of the present invention.

FIG. 1 illustrates a sensor device in accordance with a first embodiment of the present invention. The sensor device includes a sensor circuit (SC); a terminal portion (T) that is electrically connected with an external device (ED); and a sensor interface 10 located between an output of the sensor circuit (SC) and the terminal portion (T). The embodiment includes a monolithic IC that is equipped with the sensor circuit (SC) and the sensor interface 10.

The sensor circuit (SC) is configured to generate an electric signal ($S_{SC}$) corresponding to a target object's physical quantity, like a sensor such as, for example, a photodetector, a temperature sensor, a pressure sensor, a magnetic sensor, an acceleration sensor or the like. In the embodiment, the electric signal is an analog signal. However, the present invention is not limited to this. For example, an electric signal of the sensor circuit may be a digital signal.

The terminal portion (T) includes at least first and second terminals (T1 and T2). For example, as shown in FIG. 1, the first and second terminals (T1 and T2) are power (supply) and output terminals, respectively and the terminal portion (T) further includes a ground (GND) terminal as a third terminal (T3).

The sensor interface 10 includes a mode detector 20, a communication portion 30, a memory circuit 40, a signal processing circuit 50, an output circuit 60 and a power supply circuit 70. The power supply circuit 70 is configured to supply an electric power (e.g., a DC voltage(s)) to target components. The target components are at least the mode detector 20, the communication portion 30, the memory circuit 40, the signal processing circuit 50 and the output circuit 60 of the sensor circuit (SC) and components of the interface 10. In the embodiment, the power supply circuit 70 is configured to step up/down or stabilize a voltage (e.g., a DC voltage) from the power terminal (T1) to supply to the target components.

The mode detector 20 is configured to detect a mode specified by a mode signal when an input signal ($S_{T1}$) received from a side of the first terminal (T1) is the mode signal. Specifically, the mode signal is an analog signal. The external device (ED) is configured to transmit an analog signal as an input signal ($S_{T1}$) to the power terminal (T1), and also transmit a serial input signal (a digital signal) as an analog signal ($S_{T1}$) to the power terminal (T1).

The sensor device in the embodiment is configured to use sensor output, communication and transition modes. However, the present invention is not limited to this. For example, the sensor device may be configured to use at least sensor output and communication modes.

A mode signal is a signal for representing any one mode of the sensor output, communication and transition modes. The sensor output mode is a mode for transmitting an electric signal ($S_{SC5}$), obtained from the sensor circuit (SC), to a side of the output terminal (T2). The communication mode is a mode for receiving an input signal ($S_{T1}$) from a side of the power terminal (T1), and also transmitting an output signal ($S_{T2}$) to the side of the output terminal (T2). The transition mode will be described later.

The sensor interface 10 is configured to transmit an electric signal ($S_{SC5}$), obtained from the sensor circuit (SC), to the side of the output terminal (T2) when a mode detected with the mode detector 20 is the sensor output mode, and also to receive an input signal ($S_{T1}$) from the side of the power terminal (T1) while transmitting an output signal ($S_{T2}$) to the side of the output terminal (T2), when the mode detected with a mode detector 20 is the communication mode. In the example of FIG. 1, the electric signal ($S_{SC5}$) is obtained through the signal processing circuit 50 from the sensor circuit (SC), and is then transmitted to the external device (ED) at the side of the output terminal (T2) through the output circuit 60.

For this reason, the communication portion 30 includes a communication circuit 301. The communication circuit 301 is configured to transmit a serial output signal (a digital signal) as an output signal ($S_{T2}$) to the side of the output terminal (T2) when a mode detected with the mode detector 20 is the communication mode. In the embodiment, when a mode detected with the mode detector 20 is the communication mode, the communication circuit 301 is configured to store data obtained from a serial input signal in the memory circuit 40 while transmitting a serial output signal, which includes data read out from the memory circuit 40 or data obtained from a serial input signal, to the external device (ED) through the output terminal (T2), if receiving the serial input signal through the power terminal (T1) from the external device (ED).

The memory circuit 40 comprises, for example, a nonvolatile memory and is configured to store data obtained from an input signal (a serial input signal) through the communication circuit 301, and also to provide the signal processing circuit 50 with the data stored in the memory circuit 40 in accordance with the control of the signal processing circuit 50. The data stored in the memory circuit 40 can be further transmitted to the side of the output terminal (T2) through the communication circuit 301 for verification of the data.

The signal processing circuit 50 is configured to read out data stored in the memory circuit 40 and then to calibrate an output signal ($S_{SC}$) of the sensor circuit (SC) based on the data to transmit an electric signal ($S_{SC5}$), which is a calibrated signal, to the output circuit 60. For example, the signal processing circuit 50 includes a D/A converter (not shown), and is configured to produce an analog calibration signal for a gain, an offset or the like by reading out the data from the memory circuit 40 through the D/A converter to calibrate an output signal ($S_{SC}$) of the sensor circuit (SC) based on the analog calibration signal.

The output circuit 60 is arranged between the output terminal (T2) and both outputs of the signal processing circuit 50 and the communication circuit 301. The output circuit 60 is configured to output a signal from any one of the circuit 50 and 301 to a side of the output terminal (T2) in accordance with a mode detected with the mode detector 20. In the embodiment, the output circuit 60 is configured: to output an electric signal from the signal processing circuit 50 to the side of the output terminal (T2) when a mode detected with the mode detector 20 is the sensor output mode, and also to output an output signal, from the communication circuit 301, to the side of the output terminal (T2) when a mode detected with the mode detector 20 is the communication mode.

For example, the output circuit 60 includes a voltage follower that is enabled in the sensor output mode and disenabled in the transition and communication modes. For example, the mode detector 20 is configured to enable the voltage follower of the output circuit 60 when a mode detected with the mode detector 20 is the sensor output mode, and also to disenable the voltage follower of the output circuit 60 when a mode detected with the mode detector 20 is a transition or communication mode. However, the present invention is not limited to this. For example, the communication portion (or a communication circuit) may be configured to enable the voltage follower of the output circuit if the sensor output mode is obtained from an input signal, and also to disenable the voltage follower of the output circuit 60 if a transition or communication mode is obtained from an input signal.

If the voltage follower of the output circuit 60 is enabled, an output of the output circuit 60 becomes low impedance. If the voltage follower of the output circuit 60 is disenabled, the output of the output circuit 60 becomes high impedance. Therefore, if the voltage follower is enabled, an input signal of the output circuit 60 (an electric signal ($S_{SC5}$) obtained from the sensor circuit) is transmitted from the output circuit 60 of which output is low impedance.

Figure 2:
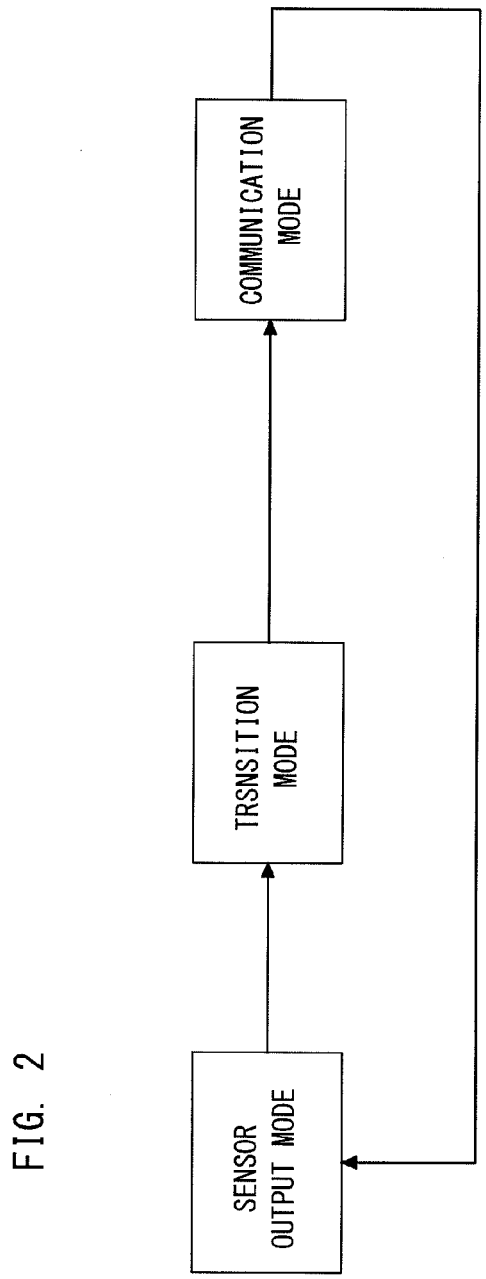
FIG. 2 is a transition diagram of a sensor output mode, a transition mode and a communication mode used by the sensor device.
Figure 3:
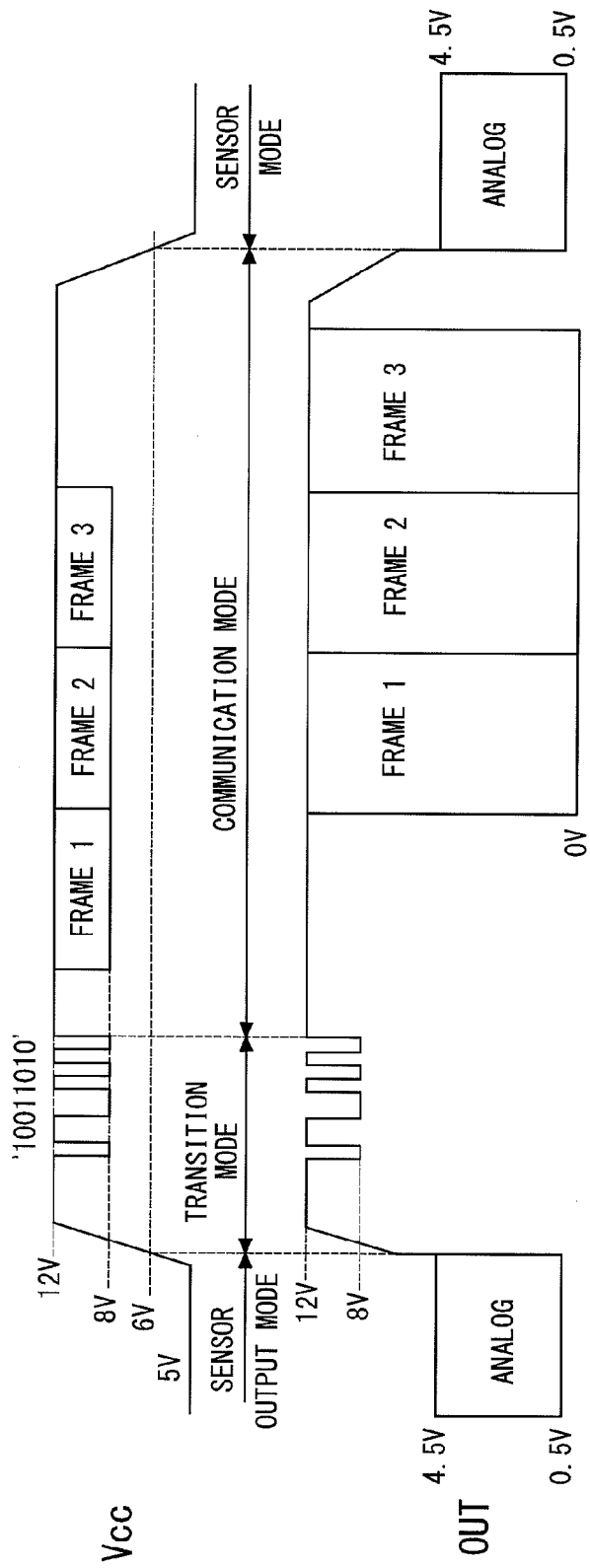
FIG. 3 is an explanatory diagram of an input signal and an output signal received and transmitted with the sensor device, respectively.

As shown in FIGS. 2 and 3, the sensor device is configured to use the sensor output, transition and communication modes, which are periodically switched in the order of the sensor output mode, the transition mode, the communication mode and the sensor output mode. That is, the mode detector 20 is configured to detect the communication mode if, in the sensor output mode, a mode designated by a mode signal received from the side of the power terminal (T1) changes (shifts) to the transition mode and then changes to the communication mode. A mode signal of a transition mode changed from the sensor output mode differs from a mode signal changed from the communication mode.

A mode signal of a transition mode changed from the sensor output mode is a voltage signal higher than a mode signal's level of a mode (i.e., the sensor output mode) before the change to the transition mode. A prescribed digital signal is further applied to the power terminal (T1) to be added to a mode signal of the transition mode changed from the sensor output mode. The prescribed digital signal is, for example, a start frame of a serial input signal.

As stated above, the sensor device is configured to receive a mode signal or a serial input signal as an input signal ($S_{T1}$) from the external device (ED), and also to transmit a serial output signal as an output signal ($S_{T2}$). Each of the serial input signal and the serial output signal includes a start frame, and at least one frame which includes start, address, command, data and stop fields that are 1-bit, 5-bit, 2-bit, 12-bit and 1-bit, respectively. The address is an address of the memory (the memory circuit 40). The command is a read, write or delete command with respect to the memory circuit 40. The start and stop represent the start and end of their own frame, respectively. The mode signal is an analog input signal of which DC voltage is changed to a first voltage (e.g., 5V) or a second voltage (e.g., 8V) higher than the first voltage.

Specifically, as shown in FIGS. 2 and 3, the sensor output mode is set by a level of a voltage applied to the power terminal (T1), namely a first voltage. The mode detector 20 detects that a current mode is the sensor output mode if a voltage of the power terminal (T1) is lower than a threshold voltage (e.g., 6V). In other words, the external device (ED) sets the current mode (an operating mode of the sensor device) to the sensor output mode by applying the first voltage to the power terminal (T1). An electric signal obtained from the sensor circuit (SC) is in a predetermined voltage range (e.g., 0.5V-4.5V), and is transmitted to the external device (ED) through the output terminal (T2) in the sensor output mode. In this instance, the output of the output circuit becomes low impedance.

If a voltage of the power terminal (T1) is higher than the threshold voltage, the mode detector 20 detects that a current mode is the transition mode. In other words, the external device (ED) sets the current mode to the transition mode by applying the second voltage to the power terminal (T1).

If receiving the prescribed digital signal, namely the start frame (e.g., '10011010') through the power terminal (T1), the mode detector 20 detects that a current mode is the communication mode. Specifically, the mode detector 20 detects that a current mode is the communication mode at a point of time when a final bit of the start frame is received. In other words, the external device (ED) sets the current mode to the communication mode by applying a serial input signal including the start frame to the power terminal (T1) while applying the second voltage to the power terminal (T1). The serial input signal in the communication mode is a digital signal of which level changes in a range between the second voltage and a third voltage (e.g., 12V) higher than the second voltage. The communication circuit 301 accordingly includes a reference voltage (not shown) configured to generate a threshold voltage (e.g., 10V) between the second and third voltages and a comparator of which first and second inputs are supplied with the threshold voltage and a serial input signal, respectively. The communication circuit 301 is configured to convert the serial input signal into a digital signal by comparing the serial input signal with the threshold voltage.

A serial output signal transmitted to the external device (ED) through the output terminal (T2) is a digital signal of which level changes in a range between the second and third voltages like the serial input signal as shown in FIG. 3.

Figure 4:
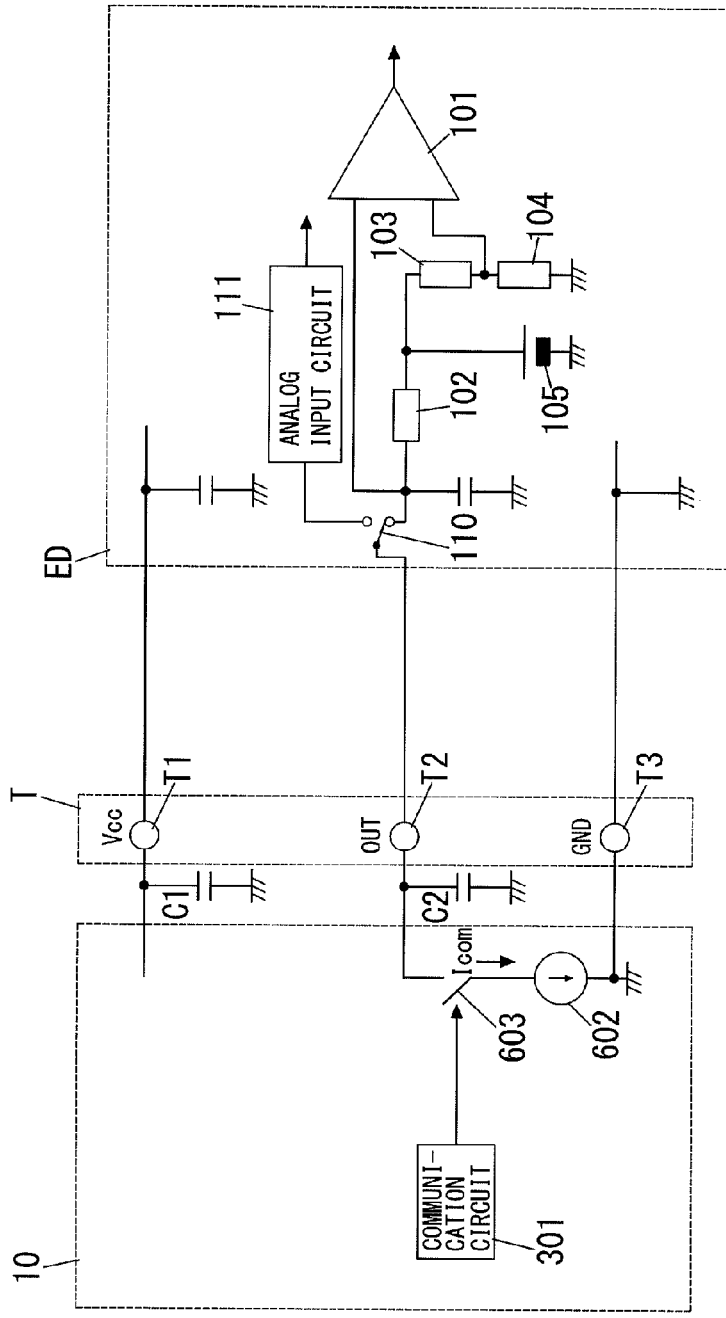
FIG. 4 illustrates a part of a digital output circuit of the sensor device and a part of a digital input circuit of an external device

The sensor interface 10 (the communication circuit 301) is configured to transmit a current signal as a serial output signal to the external device (ED) through the output terminal (T2) by supplying an electric current (a constant current), corresponding to a serial output signal, flowing through the output terminal (T2) in accordance with a clock signal. For example, the sensor interface 10 (e.g., the communication circuit 301) includes a clock for generating the clock signal. In the embodiment, as shown in FIG. 4, the sensor interface 10 further includes a constant current circuit 602 and a switch device 603 which are connected in series between the output and ground terminals (T2 and T3). The communication circuit 301 is configured to turn the switch device 603 on and off in accordance with the clock signal and a serial output signal.

In the embodiment, the output circuit 60 includes both of the voltage follower and the constant current circuit in addition to the switch device 603.

Figure 5:
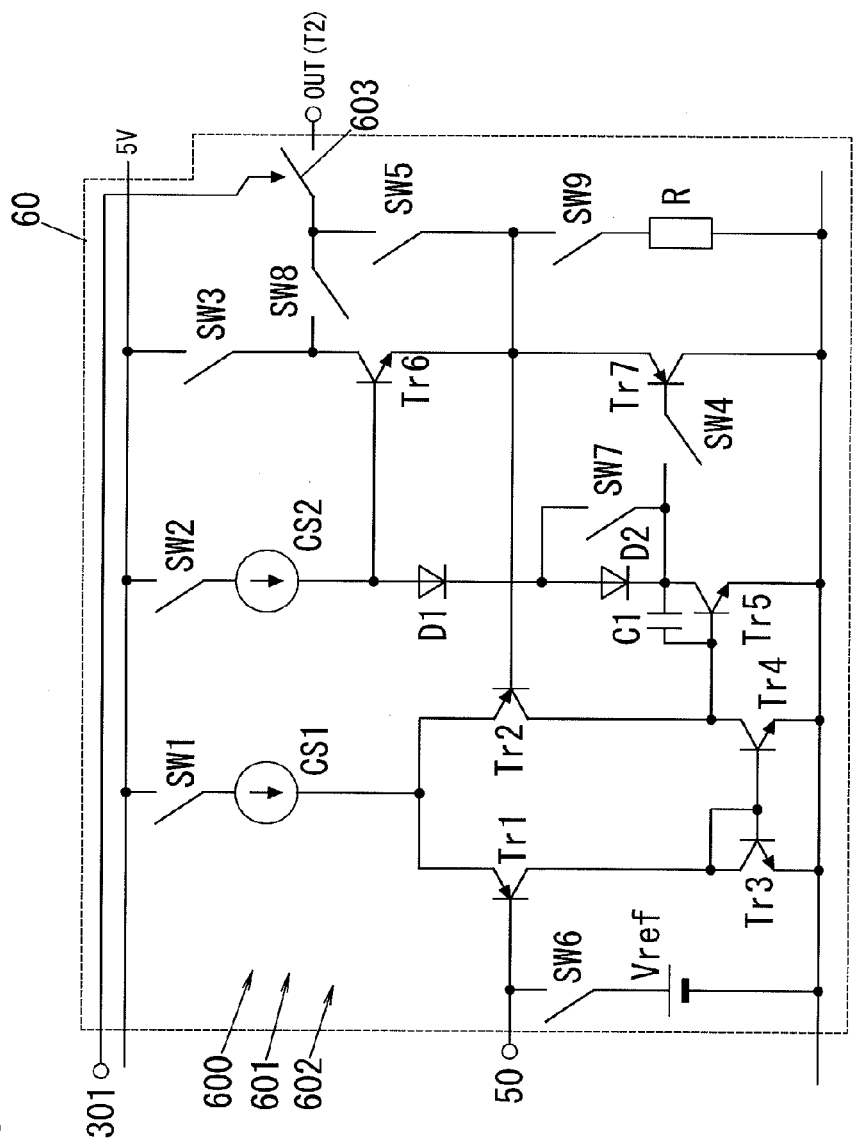
FIG. 5 is a circuit diagram of an output circuit in the sensor device.

For example, as shown in FIG. 5, the voltage follower 601 included in the output circuit 60 is formed of switch devices (SW1-SW5) and an operational amplifier 600. The operational amplifier 600 is formed of current sources (CS1 and CS2), transistors (Tr1-Tr7), diodes (D1 and D2) and a capacitor (C1). A base of the transistor (Tr1) is a first input terminal (a non-inverting input terminal) of the operational amplifier 600, a base of the transistor (Tr2) is a second input terminal (an inverting input terminal) of the operational amplifier 600, and a junction of the transistors (Tr6 and Tr7) is an output terminal of operational amplifier 600. The second input terminal is connected to the output terminal of the operational amplifier 600. If the switch devices (SW1-SW5) are turned on, the output circuit 60 functions as the voltage follower 601. That is, the voltage follower 601 is enabled if the switch devices (SW1-SW5) are turned on, and also disenabled if the switch devices (SW1-SW5) are turned off. Therefore, if the switch devices (SW1-SW5) are turned off, the output of the output circuit 60 becomes high impedance. For example, the switch device 603 is turned on when a mode detected with the mode detector 20 is the sensor output mode.

The constant current circuit 602 included in the output circuit 60 is formed of switch devices (SW6-SW9), a reference source (Vref), a resistor (R), and a part of the operational amplifier 600. The part of the operational amplifier 600 is components other than a part of a gain stage (D2) and a part of an output stage (Tr7) in the operational amplifier 600, namely the current sources (CS1 and CS2), the transistors (Tr1-Tr6), the diode (D1) and the capacitor (C1). If the switch devices (SW1, SW2 and SW6-SW9) are turned on with the voltage follower 601 disabled, the output circuit 60 functions as the constant current circuit 602. The constant current (Icom) can be calculated by Vref/R, where Vref is a voltage of the reference source and R is a resistance value of the resistor (R). In an example, the output circuit 60 further includes a switch device connected (inserted) in series to an input end of the signal processing circuit 50, and the mode detector 20 is configured to turn the switch device on if a mode designated by a mode signal is the sensor output mode and also to turn the switch device off if a mode designated by a mode signal is the communication mode.

In short, if the switch devices (SW1-SW5) are tuned on and the switch devices (SW6-SW9) are turned off, the output circuit 60 functions as the voltage follower 601. If the switch devices (SW1-SW9) are tuned off, the voltage follower 601 is disabled and the output of the output circuit 60 becomes high impedance. If the switch devices (SW1, SW2 and SW6-SW9) are tuned on and the switch devices (SW3-SW5) are turned off, the output circuit 60 functions as the constant current circuit 602. In the embodiment, the switch devices (SW1-SW9) are turned on or off through the mode detector 20, and the switch device 603 is turned on and off in accordance with a serial output signal from the communication circuit 301. Thus, since many transistors in the output circuit 60 are shared between the voltage follower and the constant current circuit, a compact sensor device can be produced at a low price.

As shown in FIG. 4, the external device (ED) is configured to receive a serial output signal ($S_{T2}$) through a digital input circuit formed of a comparator 101, resistors 102-104 and a reference source 105. The resistor 102 and the reference source 105 are connected in series while the series combination (102 and 105) is connected in parallel with the series circuit of the constant current circuit 602 and the switch device 603. The resistors 103 and 104 (a voltage divider) are connected in series while the series combination (103 and 104) is connected in parallel with the reference source 105. The comparator 101 has first and second input terminals. The first input terminal is connected between the output terminal (T2) and the resistor 102, while the second input terminal is connected to a junction of the resistors 103 and 104. The external device (ED) also includes a switch device 110 and an analog input circuit 111, and is configured to connect the digital input circuit to a side of the output terminal (T2) when receiving a serial output signal ($S_{T2}$), and also to connect the analog input circuit 111 to the side of the output terminal (T2) when receiving an electric signal obtained from the sensor circuit (SC). The external device (ED) further includes a high capability driver of which communication speed is little affected by a bypass capacitor (C1) connected to the power terminal (T1).

On the other hand, the sensor device has no driver like that of the external device (ED). For this reason, although a capacitance of a bypass capacitor (C2) connected to the output terminal (T2) is smaller than that of the bypass capacitor (C1) connected to the power terminal (T1), a communication speed of the sensor device is affected by the bypass capacitor (C2). In this instance, if a serial output signal is a voltage signal, it is necessary to supply a large current to a transmission path of the output terminal (T2) in order to discharge and charge the capacitor. If the current is decreased, the communication speed is lowered, and accordingly a high capability driver like the driver of the external device (ED) is required in order to raise the communication speed.

Therefore, in the embodiment, a digital input circuit in the external device (ED) includes the resistor 102, namely a current sensing resistor. The comparator 101 compares whether or not a voltage drop across the current sensing resistor 102 is larger than that across the voltage divider (103 and 104) thereby converting a serial output signal into digital values.

For example, in case the switch device 603 is turned off when a serial output signal is HIGH, each component parameter of the digital input circuit is set so that a voltage across the resistor 102 through which a constant current ($I_{com}$) flowing through the transmission path of the output terminal (T2) flows is larger than that of the resistor 103. In this configuration, the communication speed can be raised by decreasing a resistance value of the current sensing resistor 102.

An operation of the embodiment is explained. As shown in FIG. 3, if the external device (ED) transmits a mode signal of the first voltage to the side of the power terminal (T1), the mode detector 20 detects that a current mode is the sensor output mode. In this instance, the mode detector 20 enables the voltage follower 601 of the output circuit 60, and the output circuit 60 outputs an electric signal, from the signal processing circuit 50, to the side of the output terminal (T2). As a result, an electric signal ($S_{SC5}$) obtained from the sensor circuit (SC) is transmitted to the external device (ED) through the output terminal (T2).

If the external device (ED) transmits a mode signal of the second voltage to the side of the power terminal (T1), the mode detector 20 detects that a current mode is the transition mode. In this instance, the mode detector 20 disenables the voltage follower 601 of the output circuit 60. In an example, the mode detector 20 may maintain the enabled state of the voltage follower 601, and the output circuit 60 may maintain the connection between the output of the signal processing circuit 50 and the output terminal (T2).

If the external device (ED) transmits a serial input signal including the start frame to the side of the output terminal (T1) when applying the second voltage to the side of the output terminal (T1), the mode detector 20 detects that a current mode is the communication mode. In this instance, the mode detector 20 enables the constant current circuit 602 of the output circuit 60, and the output circuit 60 outputs a serial output signal, from the communication circuit 301, to the side of the output terminal (T2). In the embodiment, as shown in FIG. 3, the sensor interface 10 receives a serial input signal from the side of the power terminal (T1), while transmitting a serial output signal to the side of the output terminal (T2). For example, the data of a flame 1, the data of a frame 2 and the data of a frame 3 in the serial input signal are included in the data filed of a frame 1, the data field of a frame 2 and the data filed of a frame 3 in the serial output signal, respectively. In addition, each frame of the serial output signal is transmitted one frame behind in comparison with each frame of the serial input signal.

In the embodiment, an input signal ($S_{T1}$) is received through the power terminal (T1) from the external device (ED), while an output signal ($S_{T2}$) is transmitted to the external device (ED) through the output terminal (T2). It is accordingly possible to receive and transmit an input signal and an output signal at the same time, respectively, without increasing the number of terminals of the terminal portion (T).

The sensor interface 10 transmits a current signal as a serial output signal to the external device (ED) through the output terminal (T2). It is accordingly possible to prevent decrease, caused by the bypass capacitor (C2) connected to the output terminal (T2), in communication speed of a serial output signal.

Two-step transition is made by a transition mode between the transition from the sensor output mode to the communication mode, and it is accordingly possible to prevent the sensor output mode from changing to the communication mode due to a surge or a noise without discretion. A threshold is set for an input signal in the transition mode, and it is accordingly possible to easily apply the sensor device even if a bit pattern of a mode signal for shifting to the communication mode from the transition mode is more complicated than that of a mode signal for shifting to the transition mode from the sensor output mode. It is therefore possible to reduce a concern about the transition from the transition mode to the communication mode without discretion.

A mode signal of a transition mode changed from the sensor output mode is a voltage signal higher than a mode signal's level of a mode (the sensor output mode) before the change to the transition mode, and accordingly the transition mode can be set easily.

The prescribed digital signal (the start frame) is applied to the power terminal (T1) to be added to the mode signal of the transition mode changed from the sensor output mode, and accordingly the communication mode can be set easily.

The memory circuit 40 includes a nonvolatile memory, and accordingly if data for adjusting characteristics of the sensor circuit (SC) are stored in the memory circuit 40, a sensor output based on the data can be obtained even if the power to the power terminal (T1) is turned on and off.

Since the monolithic IC is equipped with the sensor circuit (SC) and the sensor interface 10, the sensor device can be compacted and produced at low cost.

In an embodiment, the sensor device is configured to use the communication, transition and sensor output modes, which are periodically switched in the order of the communication mode, the transition mode, the sensor output mode and the communication mode. In this instance, a mode signal of a transition mode changed from the communication mode is a voltage signal higher than a mode signal's level of a mode (i.e., the communication mode) before the change to the transition mode. The prescribed digital signal (the start frame) is applied to the power terminal (T1) to be added to the mode signal changed from the communication mode.

In an embodiment, the sensor device is configured to use the sensor output, transition and communication modes, which are periodically switched in the order of the sensor output mode, the transition mode, the communication mode, the transition mode, the sensor output mode and the transition mode. In this instance, a mode signal of a transition mode changed from the sensor output mode is a voltage signal higher than a mode signal's level of a mode (i.e., the sensor output mode) before the change to the transition mode, and a mode signal of a transition mode changed from the communication mode is a voltage signal higher than a mode signal's level of a mode (i.e., the communication mode) before the change to the transition mode. The prescribed digital signal (the start frame) is applied to the power terminal (T1) to be added to a mode signal of the transition mode changed from the sensor output mode, and also applied to the power terminal (T1) to be added to the mode signal changed from the communication mode.

A sensor device in accordance with a second embodiment of the present invention is explained. The embodiment differs from the first embodiment in that when a mode detected with a mode detector 20 is the communication mode, an output circuit 60 is configured to output a signal, from a signal processing circuit 50 or a communication circuit 301, to a side of an output terminal (T2) in response to a phase of the communication mode. For the purpose of clarity, like kind elements are assigned the same reference numerals as depicted in the first embodiment.

In the embodiment, the communication mode includes an input phase, an output phase, and an input and output phase, any one of which is decided by an external device (ED) and used between the external device (ED) and the sensor device. The input phase is a phase used in the case that the external device (ED) needs to transmit a serial input signal to a side of a power terminal (T1) but needs no serial output signal from the sensor device. The output phase is a phase used in the case that the external device (ED) needs a serial output signal from the sensor device but does not need to transmit any serial input signal to the side of the power terminal (T1). The input and output phase is a phase used in the case that the external device (ED) needs to transmit a serial input signal to the side of the power terminal (T1) and also need a serial output signal from the sensor device, like the communication mode in the first embodiment.

For example, data representing any phase of the aforementioned phases is included in a frame after the start frame in a serial input signal through the external device (ED).

The output circuit 60 is therefore configured, in accordance with a control of the mode detector 20 configured to operate in concert with the communication circuit 301, to output an electric signal, from the signal processing circuit 50, to the side of the output terminal (T2) if a phase of the communication mode is the input phase, and also to output a serial output signal, from the communication circuit 301, to the side of output terminal (T2) if a phase of the communication mode is the output phase or the input and output phase. That is, the communication circuit 301 is configured to transmit a phase of the communication mode to the mode detector 20.

An operation of the present embodiment is now explained. An operation in the input phase is first explained. In the communication mode, if data representing the input phase is included in any frame after the start frame, the output circuit 60 outputs an electric signal, from the signal processing circuit 50, to the side of the output terminal (T2), and also the communication circuit 301 stores data obtained from a serial input signal in a memory circuit 40 if receiving the serial input signal from the side of the power terminal (T1). In an example, the output of the output circuit 60 may be set to a high impedance in the input phase (i.e., the voltage follower 601 may be disabled).

An operation in the output phase is next explained. In the communication mode, if data representing the output phase is included in any frame after the start frame of a serial input signal, the output circuit 60 outputs a serial output signal, from the communication circuit 301, to the side of the output terminal (T2). The communication circuit 301 reads out data stored in the memory circuit 40 in accordance with a command and the like included in the serial input signal to transmit a serial output signal including the data to a side of an output terminal (T2). In an example, specified data may be read out to be transmitted, or every data may be sequentially read out to be transmitted.

An operation in the input and output phase is finally explained. In the communication mode, if data representing the input and output phase is included in any frame after the start frame of a serial input signal, the output circuit 60 outputs a serial output signal, from the communication circuit 301, to the side of the output terminal (T2). The communication circuit 301 receives a serial input signal from the side of the power terminal (T1) to store data obtained from the serial input signal in a memory circuit 40. The communication circuit 301 also reads out data stored in the memory circuit 40 in accordance with a command and the like included in the serial input signal to transmit a serial output signal including the data to the side of the output terminal (T2). In an example, specified data may be always read out to be transmitted, or every data may be sequentially read out to be transmitted.

In the present embodiment, when a phase in the communication mode is the input phase, an electric signal from the signal processing circuit 50 can be transmitted to the side of the output terminal (T2), because a serial output signal is not sent out to the side of the output terminal (T2). In short, it is possible to receive a serial input signal through the power terminal (T1) from the external device (ED), while transmitting an electric signal obtained from a sensor circuit (SC) to the external device (ED) through the output terminal (T2).

In an embodiment, the sensor device includes sensor circuits and sensor interfaces, and each output of their output circuits 60 is set to be high impedance (i.e., each voltage follower 601 is disenabled) in the input phase, which is available in the case that every sensor interface transmits common data.

Figure 6:
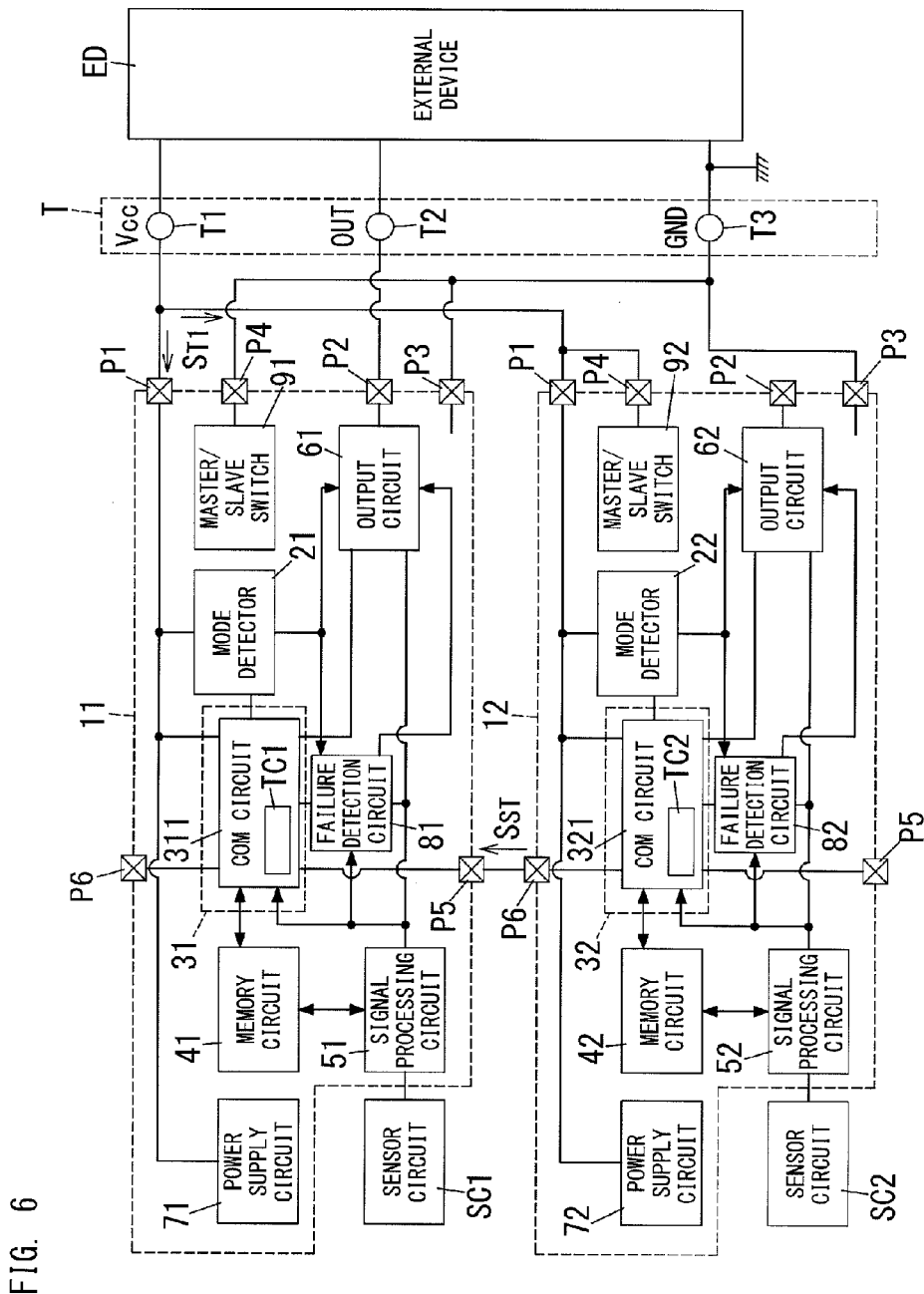
FIG. 6 is a block diagram of a sensor device in accordance with a third embodiment of the present invention

FIG. 6 illustrates a sensor device in accordance with a third embodiment of the present invention. The sensor device includes, as the aforementioned sensor circuit (SC), first and second sensor circuits (SC1 and SC2) configured to detect the same physical quantity, and further includes, as the aforementioned sensor interface 10, first and second sensor interfaces 11 and 12.

In other words, a common sensor circuit (hereinafter referred to as a "sensor circuit (SC)") is used for each of the first and second sensor circuits (SC1 and SC2), while a common sensor interface (hereinafter referred to as a "sensor interface 10") is used for each of the first and second sensor interfaces 11 and 12.

In the embodiment, a sensor circuit (SC) and a sensor interface 10 are contained in a common monolithic IC like the first embodiment, which preferably includes first to sixth pins (P1-P6).

In an example of FIG. 6, the first sensor interface 11 is electrically connected to an output of the first sensor circuit (SC1), and also electrically connected to power, output and ground terminals (T1, T2 and T3) of a terminal portion (T), like the first embodiment. On the other hand, the second sensor interface 12 is electrically connected to an output of the second sensor circuit (SC2), and also electrically connected to only the power and ground terminals (T1 and T3) of the terminal portion (T).

For example, first and second monolithic ICs and the terminal portion (T) are mounted on one printed circuit board. Pins (P1, P2 and P3) of the first monolithic IC are electrically connected to the power, output and ground terminals (T1, T2 and T3), respectively. Pins (P1 and P3) of the second monolithic IC are electrically connected to the power and ground terminals (T1 and T3), respectively. The pin (P5) of the first sensor interface 11 is electrically connected to the pin (P6) of the second sensor interface 12.

The first sensor interface 11 includes, as the aforementioned mode detector 20, communication portion 30 and memory circuit 40, a first mode detector 21, a first communication portion 31 and a first memory circuit 41, respectively, and is arranged between the output of the first sensor circuit (SC1) and the terminal portion (T). In FIG. 6, the first sensor interface 11 includes, as the mode detector 20, communication portion 30, memory circuit 40, signal processing circuit 50, output circuit 60 and power supply circuit 70, the first mode detector 21, the first communication portion 31, the first memory circuit 41, a first processing circuit 51, a first output circuit 61 and a first power supply circuit 71, respectively.

The first sensor interface 12 includes, as the mode detector 20, communication portion 30 and memory circuit 40, a second mode detector 22, a second communication portion 32 and a second memory circuit 42, respectively, and is arranged between the output of the second sensor circuit (SC2) and the terminal portion (T). In FIG. 6, the second sensor interface 12 includes, as the mode detector 20, communication portion 30, memory circuit 40, signal processing circuit 50, output circuit 60 and power supply circuit 70, the second mode detector 22, the second communication portion 32, the second memory circuit 42, a second processing circuit 52, a second output circuit 62 and a second power supply circuit 72, respectively.

In the embodiment, the first sensor interface 11 further includes a first failure detection circuit 81 and a first master/slave switch 91, and the second sensor interface 12 further includes a second failure detection circuit 82 and a second master/slave switch 92. The first and second failure detection circuits 81 and 82 are described later.

Each of the first and second master/slave switches 91 and 92 is a switch for setting its own sensor interface to any one of a master or a slave.

If one sensor interface 10 is set to the master through its own master/slave switch, the sensor interface 10 functions as the master, namely the first sensor interface 11. If another sensor interface 10 is set to the slave through its own master/slave switch, the sensor interface 10 functions as the slave, namely the second sensor interface 12.

For example, a sensor interface 10 functions as the master if its own master/slave switch is electrically connected to any one of a power or ground terminal, and also functions as the slave if its own master/slave switch is electrically connected to the other. In FIG. 6, the first master/slave switch 91 is electrically connected to the ground terminal (T3) through the pin (P4) of the first sensor interface 11, and thereby the interface 11 functions as the master. The second master/slave switch 92 is electrically connected to the power terminal (T1) through the pin (P4) of the second sensor interface 12, and thereby the interface 12 functions as the slave. In short, the first sensor interface 11 is set to the master through the first master/slave switch 91, and the second sensor interface 12 is set to the slave through the second master/slave switch 92.

The first and second communication portions 31 and 32 further have first and second transfer circuits (TC1 and TC2), respectively. In FIG. 6, the first and second transfer circuits (TC1 and TC2) are included in first and second communication circuits 311 and 321 of the first and second communication portions 31 and 32, respectively, and electrically connected with each other through the pin (P5) of the interface 11 and the pin (P6) of the interface 12.

In the embodiment, the signal processing circuit 50 of the sensor interface 10 is configured to calibrate an electric signal from the sensor circuit (SC) based on data from the memory circuit 40 to output an electric signal, which is the calibrated signal, to the output circuit 60. In the embodiment, the electric signal (the calibrated signal) is a digital signal.

In this configuration, components used for only the voltage follower (D2, Tr7 and SW5-5W9) are removed (see FIG. 5), and the output circuit 50 includes the switch devices (SW1-SW3), the constant current circuit 602 and the switch device 603. The constant current circuit 602 includes the reference source (Vref), the current sources (CS1 and C52), the transistors (Tr1-Tr6), the diode (D1), the capacitor (C1) and the resistor (R), and each part of the switch devices (SW6, SW8 and SW9) and the diode (D2) is replaced with a connection line (pattern wire).

In addition, the transfer circuit of the sensor interface 10 is configured to transmit an electric signal (a calibrated signal), obtained from the signal processing circuit 50, to a side of the pin (P6) of the interface 10, or to receive an electric signal from the pin (P5) of the interface 10. The transfer circuit of the sensor interface 10 is also configured, if receiving an electric signal from the pin (P5) of the interface 10, to transfer the electric signal to the failure detection circuit of the sensor interface 10.

That is, the transfer circuit of the slave, i.e., the second transfer circuit (TC2) is configured to transmit a serial transfer signal ($S_{ST}$), which is a second electric signal from the second signal processing circuit 52, to the first sensor interface 11 (the first transfer circuit (TC1)) through the pin (P6) of the second sensor interface 12. The transfer circuit of the master, i.e., the first transfer circuit (TC1) is configured to receive the second electric signal from the second transfer circuit (TC2) through the pin (P5) of the first sensor interface 11. The second electric signal is transferred to the first failure detection circuit 81. In this configuration, the switch device 110 and the analog input circuit 111 are removed from the external device (ED) (see FIG. 4). In an example, the first transfer circuit (TC1) may be configured to transmit a first electric signal to the external device (ED) through the first output circuit 61 if receiving the first electric signal from the first signal processing circuit 51, and also to transmit a second electric signal to the external device (ED) through the first output circuit 61 if receiving the second electric signal through the pin (P5) of the first sensor interface 11.

In short, the second sensor interface 12 is configured to transmit a first serial transfer signal to the first sensor interface 11 through the second transfer circuit (TC2) based on a second electric signal corresponding to a target object's physical quantity obtained from the second sensor circuit (SC2), when a mode detected with the second mode detector 22 is the sensor output mode. In the embodiment, the second electric signal (digital signal) is transmitted as a first serial transfer signal without change to the first sensor interface 11.

The transfer circuit of the sensor interface 10 is also configured to transfer a second serial transfer signal to a side of the pin (P6) of the interface 10 when a mode detected with the second mode detector 22 is the communication mode. That is, the second sensor interface 12 is also configured to store second data obtained from a second serial input signal in the second memory circuit 42 while transmitting a second serial transfer signal to the first sensor interface 11 through the second transfer circuit (TC2), if receiving the second serial input signal through the power terminal (T1) when a mode detected with the second mode detector 22 is the communication mode. The second serial input signal is an input signal $(S_{T1})$ addressed to the second sensor interface 12 from the external device (ED), and the second serial transfer signal is a signal for a second serial output signal as an output signal $(S_{T2})$ to the external device (ED). For example, the external device (ED) includes identification data of the second sensor interface 12 in a data field of a second serial input signal to the second sensor interface 12.

When a mode detected with the first mode detector 21 is the sensor output mode, the first sensor interface 11 is configured to transmit a first electric signal to the side of the output terminal (T2), and also to transmit a second electric signal to the side of the output terminal (T2) based on a first serial transfer signal if receiving the first serial transfer signal through the first transfer circuit (TC1). The first electric signal corresponds to a target object's physical quantity obtained from the first sensor circuit (SC1). In the embodiment, in accordance with a signal obtained from the aforementioned clock, the first signal processing circuit 51 and the first transfer circuit (TC1) alternately transfer first and second electric signals to the external device (ED) through the first output circuit 61, respectively.

The first sensor interface 11 is also configured to store first data obtained from a first serial input signal in the first memory circuit (41) if receiving the first serial input signal through the power terminal (T1), when a mode detected with the first mode detector 21 is the communication mode. The first serial input signal is an input signal $(S_{T1})$ addressed to the first sensor interface 11, transmitted from the external device (ED) and received from the side of the power terminal (T1).

For example, the external device (ED) includes identification data of the first sensor interface 11 in a data field of a first serial input signal to the first sensor interface 11. When a mode detected with the first mode detector 21 is the communication mode, the first sensor interface 11 is also configured: to transmit, as the output signal $(S_{T2})$, a first serial output signal to the external device (ED) through the output terminal (T2); and also to transmit a second serial output signal to the external device (ED) through the output terminal (T2) based on a second serial transfer signal if receiving the second serial transfer signal through the first transfer circuit (TC1).

Each failure detection circuit is enabled if its own sensor interface 10 is set to the master, and is disenabled if its own sensor interface 10 is set to the slave.

The enabled failure detection circuit, namely the first failure detection circuit 81 is configured, if a difference between a physical quantity of the first electric signal and a physical quantity of the second electric signal exceeds a predetermined threshold, to transmit an error signal, representing that the difference exceeds the threshold, to the external device (ED) through the output terminal (T2). In the embodiment, the error signal is a digital signal. In an example, a bit-signal of '00000000' is reserved as the error signal, and a bit-signal in a range of '00000001' to '11111111' is assigned to an electric signal (a calibrated signal) in accordance with a level of the electric signal.

An operation of the embodiment is explained. If the external device (ED) transmits a mode signal of the first voltage to the side of the power terminal (T1), each of the first and second mode detectors 21 and 22 detects that a current mode is the sensor output mode.

In this instance, the first mode detector 21 enables the constant current circuit of the first output circuit 61. The second mode detector 22 may enable or disable the second output circuit 62, because an output of the second output circuit 62 is not connected to the terminal portion (T). The second sensor interface 12 transmits a first serial transfer signal to the first sensor interface 11 through the second transfer circuit (TC2) based on a second electric signal from the second sensor circuit (SC2). The first sensor interface 11 transmits a first electric signal, from the first sensor circuit (SC1), to the side of the output terminal (T2) through the first output circuit 61, and also transmits a second electric signal to the side of the output terminal (T2) through the first output circuit 61 based on a first serial transfer signal if receiving the first serial transfer signal through the first transfer circuit (TC1). In the embodiment, the first and second electric signals (digital signals) are transmitted alternately. In an example, the first and second electric signals (digital signals) may be transmitted as a TDMA (Time Division Multiple Access) signal.

In the sensor output mode, if a difference between the first electric signal and the second electric signal (the first serial transfer signal) exceeds the threshold, an error signal is output from the first failure detection circuit 81 to the first output circuit 61 to be transmitted to the external device (ED) through the output terminal (T2).

If the external device (ED) transmits a mode signal of the second voltage to the side of the power terminal (T1), each of the first and second mode detectors 21 and 22 detects that a current mode is the transition mode.

In this instance, the first mode detector 21 turns the switch devices (SW1-SW3) off so that the output of the first output circuit 61 becomes high impedance (see FIG. 5). The switch device 603 of the first output circuit 61 is also turned off.

If the external device (ED) transmits a serial input signal including the start frame to the side of the output terminal (T1) when applying the second voltage to the side of the output terminal (T1), each of the first and second mode detectors 21 and 22 detects that a current mode is the communication mode. For example, the external device (ED) transmits a first serial input signal, addressed to the first sensor interface 11, to the side of the power terminal (T1), or transmits a second serial input signal, addressed to the second sensor interface 12, to the side of the power terminal (T1).

In this instance, the first mode detector 21 enables the constant current circuit of the first output circuit 61. The second sensor interface 12 stores second data obtained from a second serial input signal in the second memory circuit 42 if receiving the second serial input signal through the power terminal (T1), while transmitting the second serial transfer signal to the first sensor interface 11 through the second transfer circuit (TC2). For example, the second serial transfer signal includes data read out from the second memory circuit 42.

On the other hand, if receiving a first serial input signal through the power terminal (T1), the first sensor interface 11 stores first data obtained from the first serial input signal in the first memory circuit 41. The first sensor interface 11 also transmits a first serial output signal to the external device (ED) through the output terminal (T2), and transmits a second serial output signal to the external device (ED) through the output terminal (T2) based on a second serial transfer signal if receiving the second serial transfer signal through the first transfer circuit (TC1). For example, the first serial output signal includes data read out from the first memory circuit 41, and the second serial output signal includes data included in the second serial transfer signal (e.g., data read out from the second memory circuit 42).

In the embodiment, a common monolithic IC is equipped with a sensor circuit (SC) and a sensor interface 10 like the first embodiment, and accordingly different advantages can be obtained like the first and second embodiments.

In the embodiment, since the second communication portion 32 transmits a first or second serial transfer signal ($S_{ST}$) to the first sensor interface 11 and the first communication portion 31 receives the first or second serial transfer signal ($S_{ST}$), the first sensor interface 11 can transmit a first or second serial output signal to the side of the output terminal (T2) based on the first or second serial transfer signal ($S_{ST}$) from the second sensor interface 12, respectively. That is, each of the first and second interfaces 11 and 12 can receive an input signal from the external device and also transmit an output signal through the terminal portion (T) without increasing the number of terminals of the terminal portion (T).

In the embodiment, the second sensor interface 12 is electrically connected to only the power and ground terminals (T1 and T2) of the terminal portion (T). Even in this configuration, the first sensor interface 11 can transmit a first or second serial output signal to the side of the output terminal (T2) based on a first or second serial transfer signal ($S_{ST}$) from the second sensor interface 12 which is not connected to the output terminal (T2). For example, the external device (ED) can verify data stored in each of the first and second memory circuits 41 and 42.

In the embodiment, if a difference between a physical quantity of a first electric signal and a physical quantity of a second electric signal exceeds the predetermined threshold, the first failure detection circuit 81 transmits an error signal, representing that the difference exceeds the threshold, to the external device (ED) through the output terminal (T2), it is possible to detect malfunction of a first or second sensor circuit (SC1 or SC2).

In an embodiment, the first sensor interface 11 is configured to transmit any one of a first or second electric signal to the side of the output terminal (T2) in accordance with a configuration parameter stored in the first memory circuit 41. That is, the configuration parameter is a parameter which designates any one of a first or second electric signal. In this instance, the other is used for malfunction judgment by the master. In this embodiment, since any output (electric signal) of a first or second sensor circuit (SC1 or SC2) can be transmitted to the external device, mileage of the first and second sensor circuits can be increased. In each instance, the same communication circuit (transfer circuit) is used in the sensor output mode and the communication mode and a serial communication from the slave to the master is performed. Thus, by sharing circuits, efficiency is enhanced. In other words, multiplex communication can be realized at low cost.

Figure 7:
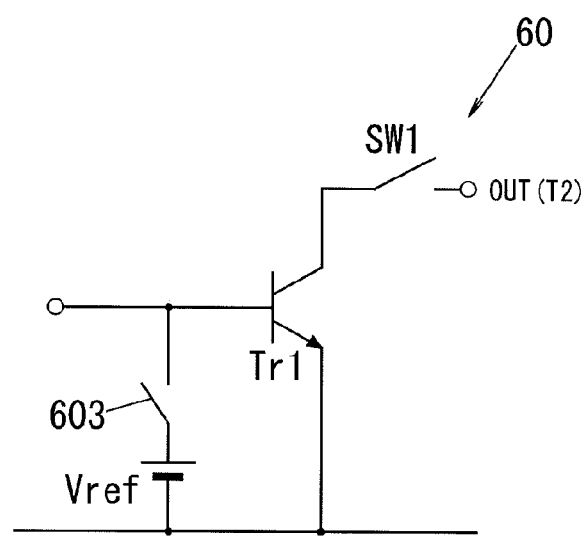
FIG. 7 illustrates an example of an output circuit in the sensor device.

In an embodiment, as shown in FIG. 7, the output circuit 60 of the sensor interface 10 includes a switch device 603 replaced with the switch device (SW6), a reference source (Vref), a transistor (Tr1), and a switch device (SW10) connected in series to the output terminal (T2) that constitute a constant current circuit. The switch device (SW10) is turned on (enabled) or turned off (disabled) through the mode detector 20. In this embodiment, the output circuit 60 can be easily configured.

Figure 8:
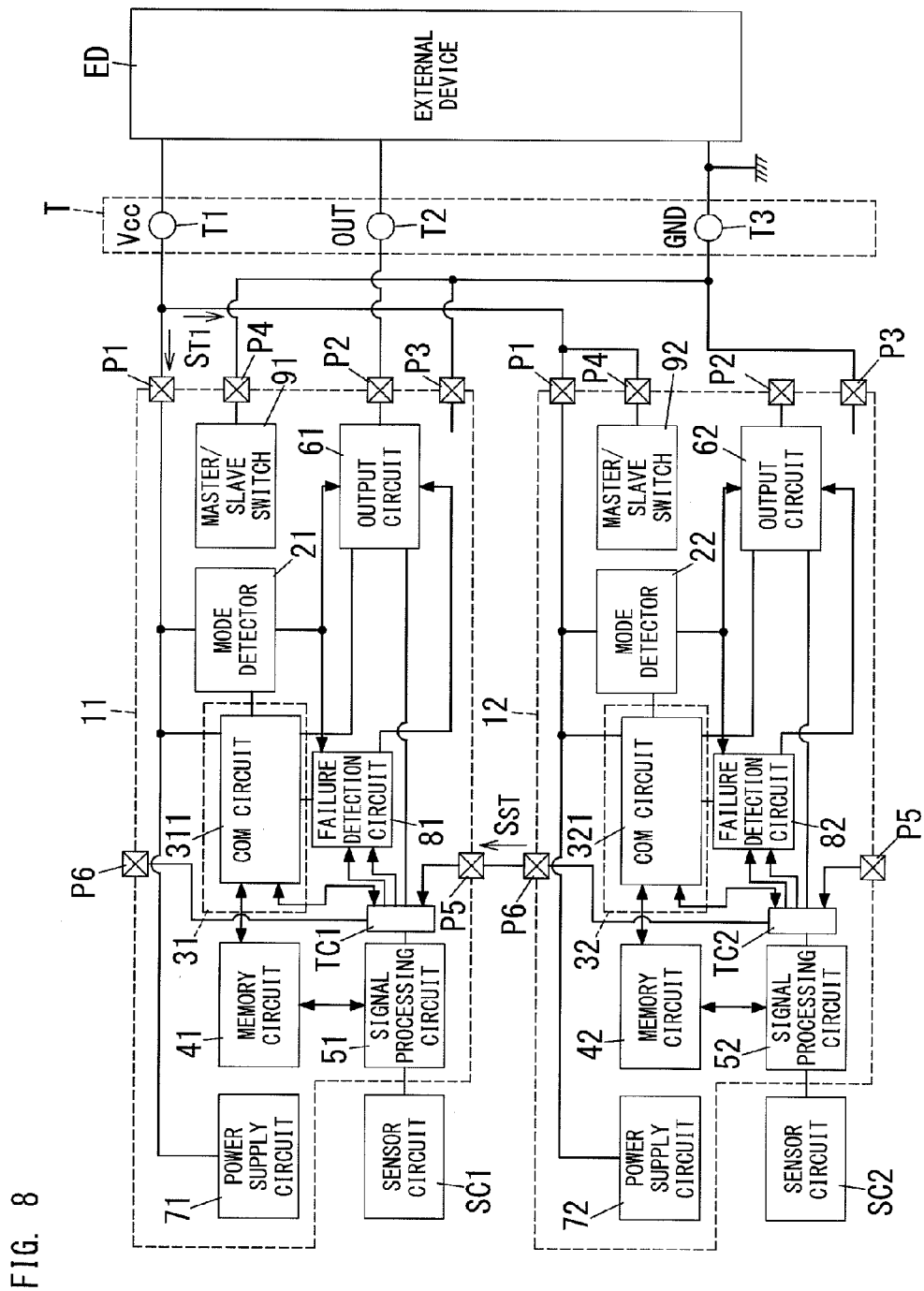
FIG. 8 is a block diagram of a sensor device in accordance with a fourth embodiment of the present invention.

FIG. 8 illustrates a sensor device in accordance with a fourth embodiment of the present invention. The sensor device differs from the third embodiment in that each of the first and second electric signals is an analog signal like the first embodiment. For the purpose of clarity, like kind elements are assigned the same reference numerals as depicted in the third embodiment.

For this reason, a transfer circuit of a sensor interface 10 in the fourth embodiment is directly connected to an output of the signal processing circuit 50. An output circuit 60 of the sensor interface 10 is configured like that in the first embodiment (see FIG. 5). That is, a first transfer circuit (TC1) of a first sensor interface 11 is directly connected to an output of the first signal processing circuit 51. A second transfer circuit (TC2) of a second sensor interface 12 is directly connected to an output of the second signal processing circuit 52.

The transfer circuit of the sensor interface 10 is also configured to transmit an electric signal (a calibrated signal), obtained from the signal processing circuit 50, to a side of a pin (P6) of the sensor interface 10 or to receive an electric signal from a pin (P5) of the sensor interface 10, when a mode detected with a mode detector 20 is the sensor output mode.

A transfer circuit of a slave, namely the second transfer circuit (TC2) is configured to transmit a second electric signal (a calibrated signal) from the second signal processing circuit 52, to the first sensor interface 11 (the first transfer circuit (TC1)) through a pin (P6) of the second sensor interface 12, when a mode detected with a second mode detector 22 is the sensor output mode. A transfer circuit of a master, namely the first transfer circuit (TC1) is configured to receive a second electric signal (a calibrated signal) from the second transfer circuit (TC2) through a pin (P5) of the first sensor interface 11 when a mode detected with a first mode detector 21 is the sensor output mode.

In addition, when a mode detected with the first mode detector 21 is the sensor output mode, the first transfer circuit (TC1) is configured to transmit a first electric signal (a calibrated signal) from the first signal processing circuit 51 and a second electric signal (a calibrated signal) from the second transfer circuit (TC2) to a first failure detection circuit 81, and also alternately transmit the first and second electric signal to a first output circuit 61. An error signal of the first failure detection circuit 81 is an analog signal, and is, for example, a HIGH signal in the embodiment. For example, if the voltage of a power terminal (T1) is 5V, the HIGH signal is set to 4.8V or more. An external device (EV) receives a HIGH signal from an output terminal (T2) as an error signal of the first failure detection circuit 81.

The transfer circuit of the sensor interface 10 is configured, when a mode detected with the mode detector 20 is the communication mode, to transmit a second serial transfer signal to a side of the pin (P6) of the interface 10, or to transfer a second serial output signal to the side of the output terminal (T2). That is, a second communication portion 32 is configured to transmit a second serial transfer signal to the first sensor interface 11 (the first transfer circuit (TC1)) through the second transfer circuit (TC2) when a mode detected with the second mode detector 22 is the communication mode. The second serial transfer signal is a signal for a second serial output signal as an output signal ($S_{T2}$) to the external device (ED). A first communication portion 31 is configured to transmit a second serial output signal to the external device (ED) through the first output circuit 61 and the output terminal (T2) based on a second serial transfer signal if receiving the second serial transfer signal through the first transfer circuit (TC1), when a mode detected with the first mode detector 21 is the communication mode.

An operation of the embodiment is explained. If the external device (ED) transmits a mode signal of the first voltage to the side of the power terminal (T1), each of the first and second mode detectors 21 and 22 detects that a current mode is the sensor output mode.

In this instance, the second transfer circuit (TC2) transmits a second electric signal (a calibrated signal), from the second signal processing circuit 52, to the first sensor interface 11 (the first transfer circuit (TC1)) through the pin (P6) of the second sensor interface 12, while the first transfer circuit (TC1) receives the second electric signal (the calibrated signal) from the second transfer circuit (TC2) through the pin (P5) of the first sensor interface 11. The first transfer circuit (TC1) also transmits a first electric signal from the first signal processing circuit 51 and the second electric signal from the second transfer circuit (TC2) to the first failure detection circuit 81, and also alternately transmits the first and second electric signals to the first output circuit 61.

The first output circuit 61 alternately transmits the first and second electric signals, from the first transfer circuit (TC1), to the side of the output terminals (T2). In addition, if a difference between a physical quantity of the first electric signal and a physical quantity of the second electric signal exceeds a predetermined threshold, the first failure detection circuit 81 transmits an error signal (a HIGH signal), representing that the difference exceeds the threshold, to the external device (ED) through the output terminal (T2).

If the external device (ED) transmits a mode signal of the second voltage to the side of the power terminal (T1), each of the first and second mode detectors 21 and 22 detects that a current mode is the transition mode. In this instance, the first mode detector 21 disenables a voltage follower of the first output circuit 61.

If the external device (ED) transmits a serial input signal including the start frame to the side of the output terminal (T1) when applying the second voltage to the side of the output terminal (T1), each of the first and second mode detectors 21 and 22 detects that a current mode is the communication mode. For example, the external device (ED) transmits a first serial input signal, addressed to the first sensor interface 11, to the side of the power terminal (T1), or transmits a second serial input signal, addressed to the second sensor interface 12, to the side of the power terminal (T1).

In this instance, the first mode detector 21 enables a constant current circuit of the first output circuit 61. The second sensor interface 12 stores second data obtained from a second serial input signal in a second memory circuit 42 if receiving the second serial input signal through the power terminal (T1), while transmitting a second serial transfer signal to the first sensor interface 11 (the first communication portion 31) through the second transfer circuit (TC2). The second serial transfer signal includes data read out from the second memory circuit 42.

On the other hand, if receiving a first serial input signal through the power terminal (T1), the first sensor interface 11 stores first data obtained from the first serial input signal in a first memory circuit 41. The first sensor interface 11 also transmits a first serial output signal to the external device (ED) through the output terminal (T2), and transmits a second serial output signal to the external device (ED) through the output terminal (T2) based on a second serial transfer signal if receiving the second serial transfer signal through the first transfer circuit (TC1). For example, the first serial output signal includes data read out from the first memory circuit 41, and the second serial output signal includes data included in the second serial transfer signal (e.g., data read out from the second memory circuit 42).

Also, in the embodiment, each of the first and second interfaces 11 and 12 can receive an input signal from the external device and also transmit an output signal through the terminal portion (T) without increasing the number of terminals of the terminal portion (T).

In an embodiment, the first signal processing circuit 51 is configured to transmit any one of a first or second electric signal (an analog signal) to the side of the output terminal (T2) in accordance with a configuration parameter stored in the first memory circuit 41. In this instance, malfunction of a first or second sensor circuit (SC1 or SC2) can be detected.

Figure 9:
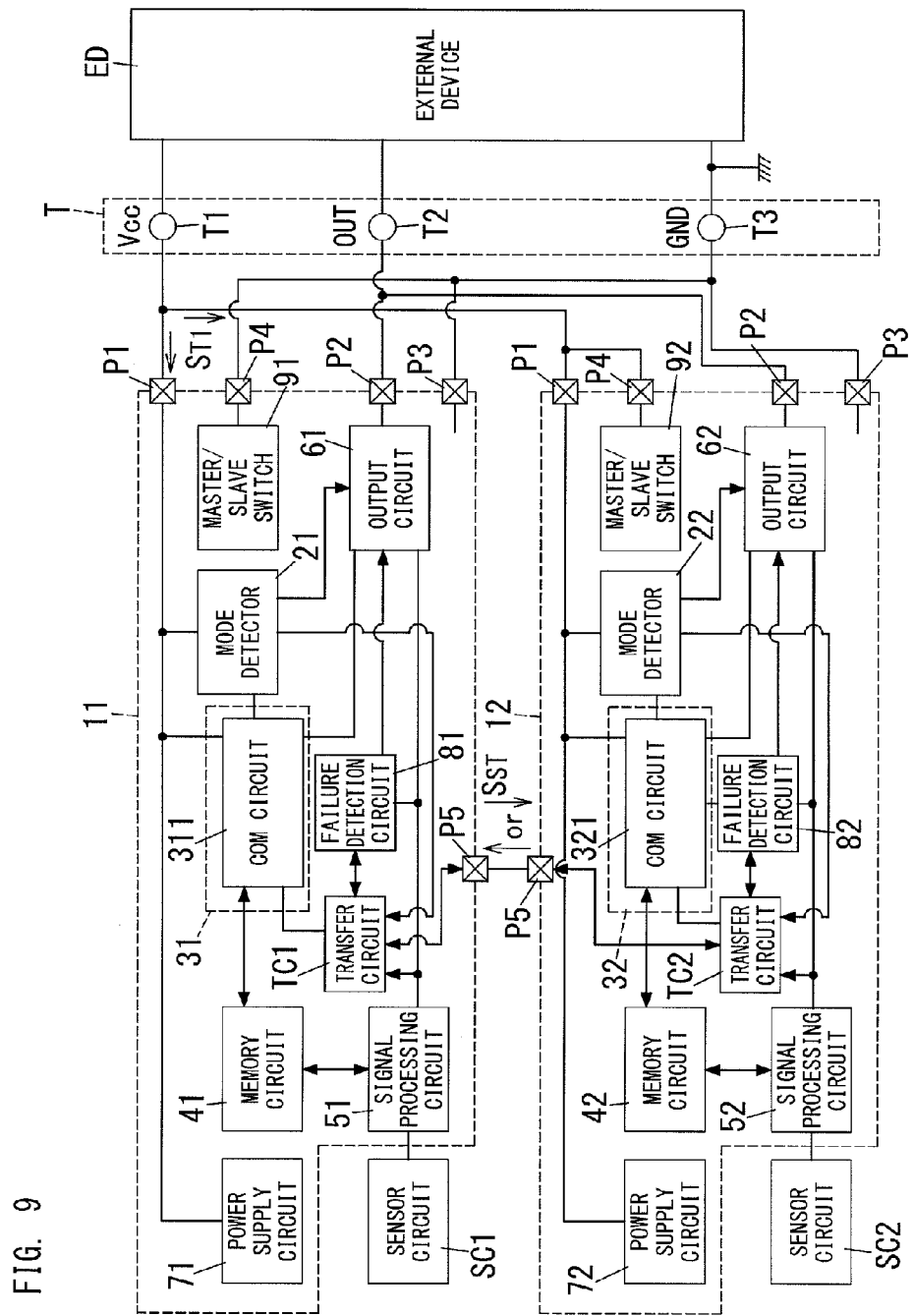
FIG. 9 is a block diagram of a sensor device in accordance with a fifth embodiment of the present invention.

FIG. 9 illustrates a sensor device in accordance with a fifth embodiment of the present invention. The sensor device differs from the fourth embodiment in that a pin (P2) of a second sensor interface 12 is further electrically connected to an output terminal (T2), and any one of first and second output circuit 61 and 62 is enabled and the other is disenabled based on each data stored in first and second memory circuits 41 and 42 in at least a sensor output mode. In transition and communication modes, first and second output circuits 61 and 62 operate like the fourth embodiment. In an example, each of the first and second output circuits 61 and 62 may be enabled or disenabled by data included in a serial input signal addressed its own sensor interface in the communication mode. For the purpose of clarity, like kind elements are assigned the same reference numerals as depicted in the fourth embodiment.

In the embodiment, each of first and second monolithic ICs includes at least first to fifth pins (P1-P5), and the pins (P5 and P5) are electrically connected with each other.

A transfer circuit of a sensor interface 10 is located at a side of an output of a signal processing circuit 50, and the output of the circuit 50 is electrically connected to the transfer circuit, an output circuit and a failure detection circuit in the sensor interface 10. When a mode detected with a mode detector 20 is the sensor output mode, the transfer circuit is configured to transmit an electric signal (a calibrated signal), obtained from a sensor circuit (SC) through the signal processing circuit 50, to a side of a pin (P5) of the sensor interface 10 or to transmit an electric signal (a calibrated signal), obtained from the pin (P5), to the failure detection circuit of the sensor interface 10. For example, the transfer circuit is configured to transmit an electric signal (a calibrated signal), obtained from the pin (P5) of the sensor interface 10, to the failure detection circuit of the sensor interface 10 if a corresponding output circuit is enabled, and also to transmit an electric signal (a calibrated signal), obtained from the sensor circuit (SC) through the signal processing circuit 50, to the side of the pin (P5) of the sensor interface 10 if a corresponding output circuit is disenabled.

That is, a first transfer circuit (TC1) is located at a side of an output of a first signal processing circuit 51, and the output of the circuit 51 is electrically connected to the first transfer circuit (TC1), a first output circuit 61 and a first failure detection circuit 81. When a mode detected with a first mode detector 21 is the sensor output mode, the first transfer circuit (TC1) is configured to transmit an electric signal (a second electric signal), obtained from the second sensor interface 12 (a second transfer circuit (TC2)) through the pins (P5 and P5), to the first failure detection circuit 81 if the first output circuit 61 is enabled, and also to transmit an electric signal (a first electric signal), obtained from a first sensor circuit (SC1) through the first signal processing circuit 51, to the second sensor interface 12 (the second transfer circuit (TC2)) through the pins (P5 and P5) if the first output circuit 61 is disenabled.

The second transfer circuit (TC2) is located at a side of an output of a second signal processing circuit 52, and the output of the circuit 52 is electrically connected to the second transfer circuit (TC2), the second output circuit 62 and a second failure detection circuit 82. When a mode detected with a second mode detector 22 is the sensor output mode, the second transfer circuit (TC2) is configured to transmit a first electric signal, obtained from the first sensor interface 11 (the first transfer circuit (TC1)) through the pins (P5 and P5), to the second failure detection circuit 82 if the second output circuit 62 is enabled, and also to transmit a second electric signal (a calibrated signal), obtained from a second sensor circuit (SC2) through the second signal processing circuit 52, to the first sensor interface 11 (the first transfer circuit (TC1)) through the pins (P5 and P5) if the second output circuit 62 is disenabled.

An operation of the embodiment is explained. If the external device (ED) transmits a mode signal of the first voltage to the side of the power terminal (T1), each of the first and second mode detectors 21 and 22 detects that a current mode is the sensor output mode.

In this instance, if the first output circuit 61 is enabled and the second output circuit 62 is disenabled, the first output circuit 61 transmits an electric signal, from the first signal processing circuit 51, to the side of the output terminal (T2). The second transfer circuit (TC2) transmits a second electric signal, from the second sensor circuit (SC2), to the first transfer circuit (TC1) through the pins (P5 and P5), while the first transfer circuit (TC1) transmits a second electric signal, obtained from the second transfer circuit (TC2), to the first failure detection circuit 81. Thereby, if a difference between a physical quantity of the first electric signal and a physical quantity of the second electric signal exceeds the threshold, the first failure detection circuit 81 transmits an error signal to the external device (ED) through the first output circuit 61 and the output terminal (T2).

If the first output circuit 61 is disenabled and the second output circuit 62 is enabled, the second output circuit 62 transmits an electric signal, from the second signal processing circuit 52, to the side of the output terminal (T2). The first transfer circuit (TC1) also transmits a first electric signal, from the first sensor circuit (SC1), to the second transfer circuit (TC2) through the pins (P5 and P5), while the second transfer circuit (TC2) transmits a first electric signal, obtained from the first transfer circuit (TC1), to the second failure detection circuit 82. Thereby, if a difference between a physical quantity of the first electric signal and a physical quantity of the second electric signal exceeds the threshold, the second failure detection circuit 82 transmits an error signal to the external device (ED) through the second output circuit 62 and the output terminal (T2).

Operations in the transition and communication modes are almost the same as those in the fourth embodiment.

Also, in the embodiment, each of the first and second interfaces 11 and 12 can receive an input signal from the external device and also transmit an output signal through the terminal portion (T) without increasing the number of terminals of the terminal portion (T).

Although the present invention has been described with reference to certain preferred embodiments, numerous modifications and variations can be made by those skilled in the art without departing from the true spirit and scope of this invention.

The invention claimed is:

1. A sensor device, comprising:
   a sensor circuit;
   a terminal portion comprising a first terminal, a second terminal and a third terminal, the first, second and third terminals being power, output and ground terminals, respectively, and configured to be connected with an external device; and
   a sensor interface that is located between an output of the sensor circuit and the terminal portion,
   the sensor interface comprising a communication portion, a memory circuit, and a mode detector configured to detect a mode specified by a mode signal when an input signal received from a side of the first terminal is the mode signal,
   the sensor interface being configured to transmit an electric signal, corresponding to a target object's physical quantity obtained from the sensor circuit, to a side of the second terminal that is the output terminal when the mode detected with the mode detector is a sensor output mode, and to receive an input signal from the side of the first terminal while transmitting an output signal to the side of the second terminal, when the mode detected with the mode detector is a communication mode, and
   the communication portion being configured to store data obtained from a serial input signal in the memory circuit while transmitting a serial output signal, which is said output signal, to the external device through the output terminal, if receiving a serial input signal when the mode detected with the mode detector is the communication mode, said serial input signal being said input signal transmitted from the external device and received from a side of the power terminal.

2. The sensor device of claim 1, wherein the sensor interface is configured to transmit a current signal as said serial output signal to the external device through the output terminal by supplying an electric current corresponding to the serial output signal through the output terminal in accordance with a clock signal.

3. The sensor device of claim 1, wherein
   the mode detector is configured to detect a communication mode if, in the sensor output mode, a mode designated by a mode signal received from the side of the first terminal changes to a transition mode and then changes to the communication mode, and the mode signal of the transition mode changed from the sensor output mode differs from the mode signal changed from the communication mode.

4. The sensor device of claim 3, wherein a mode signal of a transition mode changed from at least one of the sensor output mode and the communication mode is a voltage signal higher than a mode signal's level of a mode before the change to the transition mode.

5. The sensor device of claim 4, wherein a prescribed digital signal is applied to the power terminal to be added to at least one of the mode signal of the transition mode changed from the sensor output mode and the mode signal changed from the communication mode.

6. The sensor device of claim 1, wherein the memory circuit comprises a nonvolatile memory.

7. The sensor device of claim 1, comprising a monolithic IC equipped with the sensor circuit and the sensor interface.

8. The sensor device of claim 1, wherein the sensor interface further comprises:
a signal processing circuit configured to calibrate the electric signal from the sensor circuit based on the data stored in the memory circuit; and
an output circuit which is arranged between the output terminal and both of the communication portion and the signal processing circuit, and is configured to output the electric signal calibrated with the signal processing circuit to the side of the output terminal and to output the serial output signal, from the communication portion, to the side of the output terminal.

9. The sensor device of claim 8, wherein
the communication portion comprises a communication circuit configured to transmit said output signal to the side of the second terminal, and
the output circuit is configured;
to output the electric signal, from the signal processing circuit, to the side of the output terminal when the mode detected with the mode detector is the sensor output mode; and
to output the output signal, from the communication circuit, to the side of the output terminal when the mode detected with the mode detector is the communication mode.

10. The sensor device of claim 1, comprising, as said sensor circuit, first and second sensor circuits configured to detect the same physical quantity, wherein
the sensor device comprises, as said sensor interface, first and second sensor interfaces,
as said mode detector, said communication portion and said memory circuit, said first sensor interface comprises a first mode detector, a first communication portion and a first memory circuit, respectively while said second sensor interface comprises a second mode detector, a second communication portion and a second memory circuit, respectively,
said first sensor interface is arranged between an output of the first sensor circuit and the terminal portion,
said second sensor interface is arranged between an output of the second sensor circuit and the terminal portion,
the first and second sensor interfaces comprise first and second transfer circuits, respectively, and
one of a first or second transfer circuit is configured to receive a serial transfer signal, and the other is configured to transmit the serial transfer signal to said one of a first or second transfer circuit.

11. The sensor device of claim 10, wherein
the second transfer circuit is configured to transmit the serial transfer signal to the first transfer circuit, and
wherein the first transfer circuit is configured to receive the serial transfer signal.

12. The sensor device of claim 11, wherein the second sensor interface is electrically connected with the output of the second sensor circuit while electrically connected with only the power and ground terminals of the terminal portion.

13. The sensor device of claim 12, wherein
the second sensor interface is configured:
to transmit a first serial transfer signal to the first sensor interface through the second transfer circuit based on a second electric signal corresponding to a target object's physical quantity obtained from the second sensor circuit, when the mode detected with the second mode detector is the sensor output mode; and
to store second data obtained from a second serial input signal in the second memory circuit while transmitting a second serial transfer signal to the first sensor interface through the second transfer circuit, if receiving the second serial input signal through the power terminal when the mode detected with the second mode detector is the communication mode, said second serial input signal being an input signal addressed to the second sensor interface from the external device, said second serial transfer signal being for a second serial output signal as said output signal to the external device, and
wherein the first sensor interface is configured: when the mode detected with the first mode detector is the communication mode,
to store first data obtained from a first serial input signal in the first memory circuit if receiving a first serial input signal through the power terminal, said first serial input signal being an input signal addressed to the first sensor interface, transmitted from the external device and received from the side of the power terminal; and
to transmit, as said output signal, a first serial output signal to the external device through the output terminal, and, if receiving said second serial transfer signal through the first transfer circuit, to transmit the second serial output signal to the external device through the output terminal based on the second serial transfer signal.

14. The sensor device of claim 12, wherein
the second sensor interface is configured to transmit a first serial transfer signal to the first sensor interface through the second transfer circuit based on a second electric signal corresponding to a target object's physical quantity obtained from the second sensor circuit, when the mode detected with the second mode detector is the sensor output mode, and
the first sensor interface is configured: when the mode detected with the first mode detector is the sensor output mode,
to transmit a first electric signal to the side of the output terminal, said first electric signal corresponding to a target object's physical quantity obtained from the first sensor circuit; and
to transmit a second electric signal to the side of the output terminal based on the first serial transfer signal if receiving the first serial transfer signal through the first transfer circuit.

15. The sensor device of claim 14, wherein the first sensor interface is configured to transmit any of the first and second electric signals to the side of the output terminal in accordance with a configuration parameter stored in the first memory circuit.

16. The sensor device of claim 13, wherein the first sensor interface further comprises a failure detection circuit configured, if a difference between a physical quantity of the first electric signal and a physical quantity of the second electric signal exceeds a predetermined threshold, to transmit an error signal, representing that the difference exceeds the threshold, to the external device through the output terminal.

17. A sensor interface located between an output of a sensor circuit and a terminal portion, wherein the terminal portion comprises a first terminal, a second terminal and a third terminal, the first, second and third terminals being power, output and ground terminals, respectively, and configured to be connected with an external device, and the sensor interface comprising a communication portion, a memory circuit, and a mode detector configured to detect a mode specified by a mode signal when an input signal received from a side of the first terminal is the mode signal, the sensor interface being configured to transmit an electric signal, corresponding to a target object's physical quantity obtained from the sensor circuit, to a side of the second terminal that is the output terminal when the mode detected with the mode detector is a sensor output mode, and to receive an input signal from the side of the first terminal while transmitting an output signal to the side of the second terminal, when the mode detected with the mode detector is a communication mode, the communication portion being configured to store data obtained from a serial input signal in the memory circuit while transmitting a serial output signal, which is said output signal, to the external device through the output terminal, if receiving a serial input signal when the mode detected with the mode detector is the communication mode, said serial input signal being said input signal transmitted from the external device and received from a side of the power terminal.

* * * * *